United States Patent [19]

Hagin et al.

[11] Patent Number: 4,796,488
[45] Date of Patent: Jan. 10, 1989

[54] DIFFERENTIAL WHOSE A RING GEAR IS MOUNTED IN SOUND DAMPING MANNER ON ITS CARRIER

[75] Inventors: Faust Hagin, Munich; Franz Seethaler, Karlsfeld; Robert Zelinka, Munich; Manfred Stiglmaier, Gilching, all of Fed. Rep. of Germany

[73] Assignee: Man Nutzfahrzeuge GmbH, Munich, Fed. Rep. of Germany

[21] Appl. No.: 25,506

[22] Filed: Mar. 13, 1987

[30] Foreign Application Priority Data

Mar. 18, 1986 [DE] Fed. Rep. of Germany ....... 3609034

[51] Int. Cl.$^4$ .......................... F16H 1/40; F16H 55/14
[52] U.S. Cl. .......................................... 74/713; 74/443
[58] Field of Search ................. 74/713, 411, 424, 443

[56] References Cited

U.S. PATENT DOCUMENTS

| | | | |
|---|---|---|---|
| 314,472 | 3/1885 | Plamondon | 74/443 |
| 1,043,012 | 10/1912 | Hudson | 74/443 |
| 2,683,380 | 7/1954 | Hutton | 74/443 |
| 2,861,479 | 11/1958 | Muller | 74/713 |
| 4,674,351 | 6/1987 | Byrd | 74/443 |

FOREIGN PATENT DOCUMENTS 675967  7/1952  United Kingdom ................. 74/443

Primary Examiner—Dirk Wright
Attorney, Agent, or Firm—Roberts, Spiecens & Cohen

[57] ABSTRACT

A drive axle with a gear ring meshing with a drive pinion is designed with silent running properties, in that an intermediate member is secured to the differential carrier and is connected to the gear ring by an elastic coupling. Between the contacting faces of the gear ring and the intermediate member there are annular grooves and a cylindrical space is formed between an inner face of the gear ring and an outer cylindrical face of the intermediate member. The cylindrical space and the annular rings are filled with a viscous substance.

12 Claims, 1 Drawing Sheet

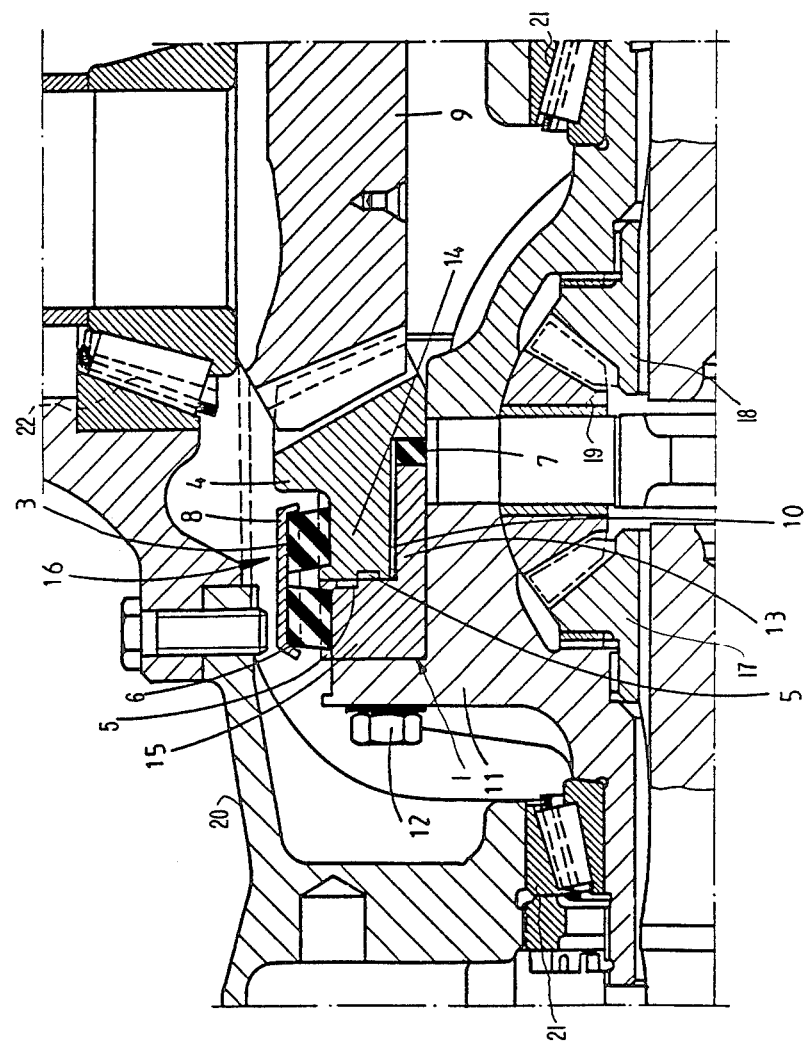

DIFFERENTIAL WHOSE A RING GEAR IS MOUNTED IN SOUND DAMPING MANNER ON ITS CARRIER

BACKGROUND OF THE INVENTION

The invention relates to a drive axle construction with a ring gear engaging a drive pinion.

The gearing employed in conventional drive axles tends to produce a substantial amount of noise whose main component is the noise due to the meshing of the ring gear with its drive pinion. The gear ring may in fact be said to act as a resonant body.

SUMMARY OF THE INVENTION

One specific object of the present invention is to produce a comparatively silent running drive axle.

Looked at from a different aspect, the present invention contemplates the design of a drive axle in which the noise level produced by the engagement of the ring gear with the universal joint shaft is considerably reduced.

In order to achieve these or other objects appearing from the present specification and claims, the invention provides a system for damping the ring gear.

Viewed from another aspect the invention may be said to relate to a drive axle comprising a differential case, two differential side bevel gears, two differential bevel pinions in meshing engagement with said differential side gears, a differential carrier supporting said bevel pinions and said bevel gears, a drive pinion having means for connection with an external drive shaft, bearing means for supporting said carrier and said drive pinion in said case, and a ring gear mounted in a sound damping manner on said carrier, said ring gear being positioned for meshing engagement with said drive pinion.

This damping system may consist of an intermediate member joined to the differential housing and an elastic coupling joining the ring gear to the intermediate member, while between the contacting faces of the ring gear and the intermediate member there is at least one annular groove and/or an annular clearance in order to hold viscous material. This construction of the invention makes possible a substantial reduction in the transmission of gear noise, axial and radial vibrations of the pinion acting on the ring gear being essentially damped by the viscous substance and the intermediate member, which is preferably in the form of a ductile iron component. The reduction in the level of noise in the drive axle considerably cuts down the overall vehicle noise level.

In accordance with one preferred feature of the invention, the elastic coupling includes two elastic rings and an outer sleeve spanning the rings so as to firmly join them together. This design has the advantages of being able to be simply and cheaply manufactured. A further advantage is that it is no trouble at all to accommodate it in the interior of the differential case without having to redesign it so as to have a different configuration.

In accordance with a further feature of the invention, the ring gear is arranged on the a horizontal tubular extension of the intermediate member so that it may slide therealong. This design feature bestows two degrees of freedom on the gear ring which may be used by the elastic coupling as part of its function of damping noise.

The elastic coupling may comprise elastic rings which are made with such a thickness that there is an additional pressing force counteracting any rocking moments. In this case the pressure force has to be sufficiently high in order to resist the rocking moments due to the meshing engagement of the pinion and ring gear and the force tending to push the intermediate member and the ring gear away from each other.

In accordance with a more particularly significant feature of the invention, there is a gap left between the cylindrical face of the horizontal stub of the intermediate member and the cylindrical face of the non-toothed part of the ring gear in order to receive the viscous material. This feature, which is very simple and does not affect production costs in the least, makes a substantial contribution to the above-mentioned overall damping or sound deadening effect since the noise which would otherwise be produced by the rolling action with radial contact between two metal components is suppressed. The same sort of useful effect is also due to making the intermediate member of ductile iron with its well known damping properties.

BRIEF DESCRIPTION OF THE DRAWING

The single FIGURE of the drawing is a cross section through part of a drive axle according to the invention.

DETAILED DESCRIPTION

An intermediate member 1 preferably made of ductile iron is secured to a differential carrier 11 by means of bolts 12. On a horizontal tubular extension 13 of the intermediate member 1 a ring gear 4 is mounted so that it is able to slide in its axial direction. The ring gear 4 is in mesh with an input pinion 9. The outer circumferential face of the intermediate member 1 and the outer circumferential face of the non-toothed part 14 of the ring gear 4 have axially extending spline grooves therein and have elastic rings 3 and 6 fitted around them which have splines on their inner faces. Such splines are fitted into the grooves in order to provide a positive locking engagement between the rings 3 and 6 on the one hand and the ring gear 4 and the intermediate member 1 on the other. Such connection between the rings and the gear 4 and the intermediate member is reinforced by vulcanizing. In order to form an elastic coupling generally designated by numeral 16, the two rings 3 and 6 are connected together with a positive locking effect by an outer concentric sleeve 8 which spans them in the axial direction and has axial grooves to interlock the rings 3 and 6 and is furthermore bonded to them by vulcanizing. At the radial end faces of the main body 15 of the intermediate member 1 and of the non-toothed part 14 of the ring gear 4 there are concentric grooves 5 which are filled with a viscous material. Between the inner concentric face of the extension 13 of the intermediate member 1 and the outer concentric face of the non-toothed part 14 of the ring gear 4 there is a clearance 10 which is also filled with viscous material. A packing ring 7 arranged on the radial end face of the ring gear 4 prevents escape of the viscous filling, Supported by the differential carrier 11 are side gears 17, 18 which mesh with differential pinions one of which is visible in the drawing and is designated by numeral 19. A differential case 20 supports the carrier 11 by bearings 21 and input pinion 9 by bearings 22.

What is claimed is:
1. A drive axle comprising:
a differential case,
two differential side gears, two differential pinions positioned for meshing engagement with said differential side gears, a differential carrier supporting said differential pinions and said side gears, a drive pinion having means for connection with an external drive shaft, bearing means for supporting said carrier and said drive pinion in said case, a ring gear in meshing engagement with said drive pinion, and means mounting said ring gear on said carrier in sound damping manner, including, an intermediate member rigidly connected with said carrier, an elastic coupling connecting said ring gear to said intermediate member, and vibration deadening material between adjacent faces of said ring gear and said intermediate member.

2. The drive axle as claimed in claim 1 wherein said vibration deadening material includes viscous material located in concentric grooves provided in mutually contacting faces of said intermediate member and said gear ring.

3. The drive axle as claimed in claim 1 wherein said vibration deadening material includes viscous material located in concentric grooves in a space left between two concentric faces of said gear ring and said intermediate member.

4. The drive axle as claimed in claim 1 wherein said intermediate member is formed with a concentric tubular extension thereon on which said gear ring is mounted concentrically with a sliding fit.

5. The drive axle as claimed in claim 1 wherein said elastic coupling comprises two concentric rings of pliable elastic material with the properties of rubber and a concentric sleeve surrounding the rings, said rings being placed around said intermediate member and said gear ring respectively and being placed within said sleeve, said elastic rings interlockingly engaging said sleeve at an inner face thereof and interlocking an outer face of a non-toothed part of said ring gear and an outer face of said intermediate member respectively.

6. The drive axle as claimed in claim 5 wherein said elastic rings are vulcanized to said ring gear, said intermediate member and said sleeve.

7. The drive axle as claimed in claim 5 wherein said elastic rings said a thickness to produce an additional pressing force opposing any tilting forces.

8. The drive axle as claimed in claim 4 wherein there is a radial clearance between a cylindrical outer face of said extension and an inner cylindrical face of said ring gear, said cylindrical faces being generally concentric and having a viscous material therebetween.

9. The drive axle as claimed in claim 4 wherein there is a radial clearance between a cylindrical outer face of said extension and an inner cylindrical face of said gear ring, said cylindrical faces being generally concentric and having a viscous material therebetween in said radial clearance, said clearance being closed at one axial end thereof by a radial face of said intermediate member and at the other by a packing of sealing material.

10. The drive axle as claimed in claim 5 wherein said elastic rings are made of rubber.

11. The drive axle as claimed in claim 1 wherein said intermediate member is made from ductile iron.

12. The drive axle as claimed in claim 5 wherein said sleeve is made of steel.

* * * * *

UNITED STATES PATENT AND TRADEMARK OFFICE
CERTIFICATE OF CORRECTION

PATENT NO. : 4,796,488
DATED : January 10, 1989
INVENTOR(S) : Hagin, Faust et al.

It is certified that error appears in the above—identified patent and that said Letters Patent is hereby corrected as shown below:

Title page:

The correct name of the assignee is:

MAN Nutzfahrzeuge GmbH

Signed and Sealed this

Ninth Day of January, 1990

*Attest:*

JEFFREY M. SAMUELS

*Attesting Officer*     *Acting Commissioner of Patents and Trademarks*